United States Patent [19]

Taite et al.

[11] 4,318,121
[45] Mar. 2, 1982

[54] INTERIOR DECOR COMPOSITION AND DISPLAY SYSTEMS

[75] Inventors: Jason Taite, 4185 Alonzo Ave., Encino, Calif. 91316; Leonard A. Ferrari, San Clemente, Calif.

[73] Assignee: Jason Taite, Encino, Calif.

[21] Appl. No.: 147,406

[22] Filed: May 6, 1980

[51] Int. Cl.³ ............................................. H04N 9/535
[52] U.S. Cl. ........................................ 358/22; 358/81; 358/183
[58] Field of Search ................... 358/22, 81, 93, 183, 358/104

[56] References Cited

U.S. PATENT DOCUMENTS

| 2,883,763 | 4/1959 | Schaper. |
| 2,974,190 | 3/1961 | Geiger. |
| 3,486,242 | 12/1969 | Aronson. |
| 3,560,644 | 2/1971 | Petrocelli et al. |
| 3,595,987 | 7/1971 | Vlahos. |
| 3,749,822 | 7/1973 | Van der Veer et al. |
| 3,784,742 | 1/1974 | Burnham et al. |
| 3,787,619 | 1/1974 | Wolff. |
| 3,862,358 | 1/1975 | Wolff. |
| 3,978,280 | 8/1976 | Kavanagh et al. |
| 4,073,368 | 2/1978 | Mustapick. |
| 4,107,854 | 8/1978 | Bougon. |
| 4,156,237 | 5/1979 | Okada et al. ..................... 358/22 |

OTHER PUBLICATIONS

*Modern Floor Covering Magazine*, Oct. 1978, Charleson Publishing Co., New York, p. 22.

*Primary Examiner*—Richard Murray
*Attorney, Agent, or Firm*—Benoit Law Corporation

[57] ABSTRACT

The subject display systems are of particular utility in assisting interior decorators and homemakers in selecting appropriate color and fabric combinations. In particular, the subject display systems provide a luminance image of an interior decor including components, such as furniture, drapes and carpets. The system picks up colors from different samples, each of which typically has an area smaller than the area of any displayed component. These picked-up colors are selectively filled in the displayed components when the image is displayed and color arrangements are changed by substituting other picked-up colors in the display of particular components.

22 Claims, 1 Drawing Figure

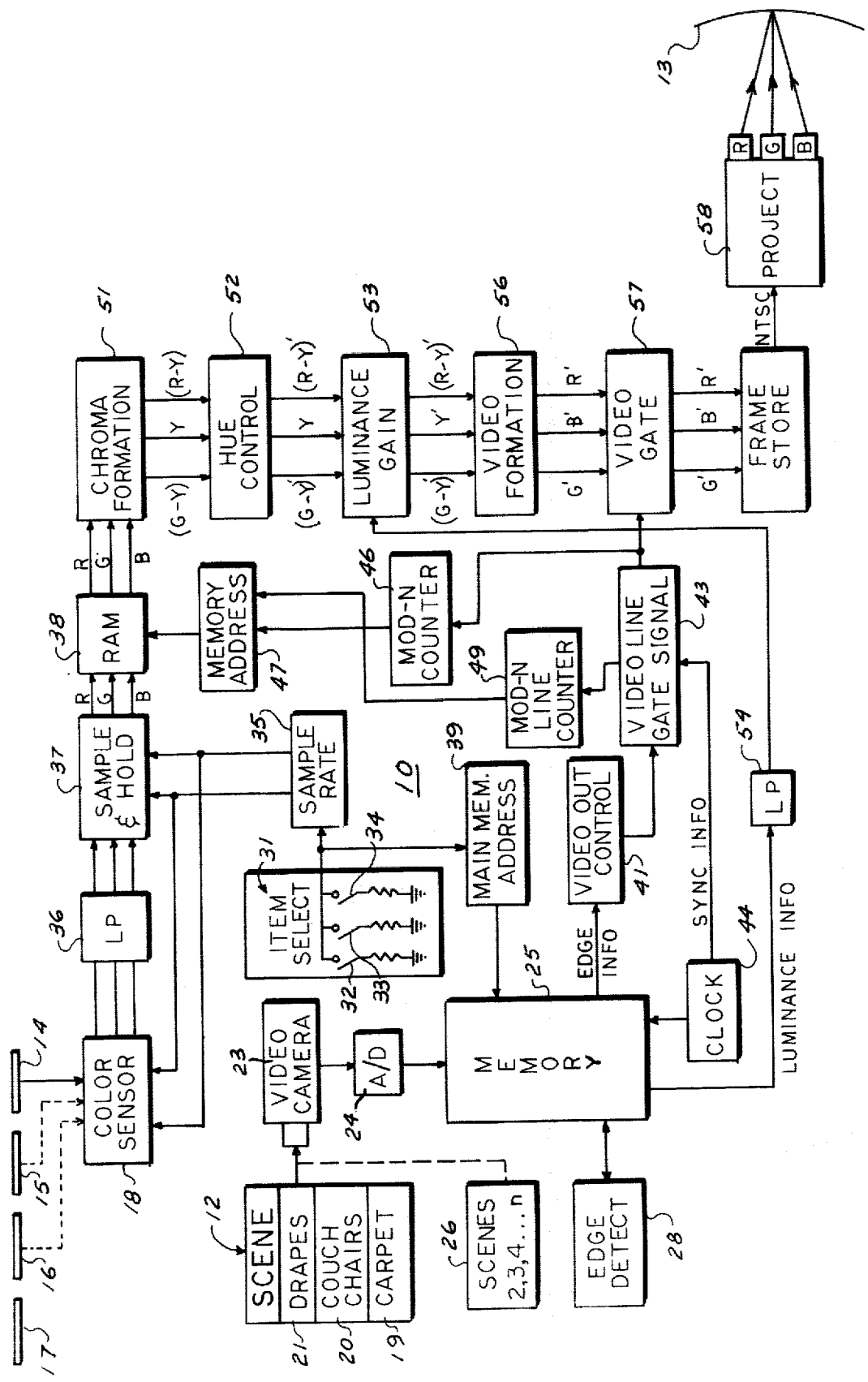

INTERIOR DECOR COMPOSITION AND DISPLAY SYSTEMS

BACKGROUND OF THE INVENTION

1. Field of the Invention

The subject invention relates to visual display systems, electronic video display systems and, more particularly, to methods and apparatus for selectively displaying and for assisting the composition of interior decors, to marketing and simulation systems and, more particularly, to systems for assisting decorators and homemakers in selecting appropriate color and fabric combinations for interior decors.

2. Disclosure Statement

This disclosure statement is made pursuant to the duty of disclosure imposed by law and formulated in 37 CFR 1.56(a). No representation is hereby made that information thus disclosed in fact constitutes prior art inasmuch as 37 CFR 1.56(a) relies on a materiality concept which depends on uncertain and inevitably subjective elements of substantial likelihood and reasonableness, and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments subsequent in time or priority.

The legend of a futuristic illustration on page 22 of the *Modern Floor Covering Magazine* (October 1978) 50th Anniversary Issue (Charleson Publishing Co., New York) opines that it would take until the next century before modern electronics and computers will be capable of rendering "shopping for carpet . . . easy and exciting."

On the basis of state of the art technology, such contemporary pessimism appears well justified, as may, for instance, be seen from the results of a patent search on the subject, which yielded the following U.S. Pat. Nos.:

2,883,763, by O. F. Schaper, issued Apr. 28, 1959, for a Carrier Landing Trainer, and disclosing systems for simulating moving environments with the aid of several television cameras and scaled replicas, 2,974,190, by J. R. Geiger, issued Mar. 7, 1961, for Electronic Matting Apparatus employing background television camera systems and subject television camera systems in combination, 3,486,242, by M. Aronson, issued Dec. 30, 1969, for an assault boat coxswain trainer employing TV camera and projector systems in conjunction with ship's motion, engine, wave motion and equation transformation computers, 3,560,644, by E. A. Petrocelli et al, issued Feb. 2, 1971, for a Multiple Projection Television System employing a background camera in combination with ship model cameras, 3,595,987, by P. Vlahos, issued July 27, 1971, for Electronic Composite Photography combining separate background and foreground scenes, 3,749,822, by Van der Veer et al, issued July 31, 1973, for animation method and apparatus combining background and foreground film frames, 3,784,742, by Burnham et al, issued Jan. 8, 1974, for Ground-Based Flight Simulating Apparatus combining an optical projector with a rear-projection screen and concave viewing mirror, 3,787,619, by H. H. Wolff, issued Jan. 22, 1974 for Wide Angle Display System using a wide angle scene having a narrow angle image projected onto it, with part of the wide angle scene being removed for the narrow angle scene, 3,862,358, by H. H. Wolff, issued Jan. 21, 1975 for Visual Simulation System employing a background image changing in accordance with computed movements and a relatively moving inserted foreground image, 3,978,280, by L. G. Kavanagh et al, issued Aug. 31, 1976 for Image Analysis Apparatus with cathode ray tube and associated light pen, 4,073,368, by A. J. Mustapick, issued Feb. 14, 1978, for Automated Merchandizing System employing communication stanchions in parking lots for a selection of items of merchandise displayed on a screen, and 4,107,854, by P. P. A. Bougon, issued Aug. 22, 1978, for Training System for Simulating an Animated Scene wherein an image of an object is inserted electronically into an animation zone image.

SUMMARY OF THE INVENTION

It is a general object of this invention to provide improved visual display systems and, in particular, improved electronic video display methods and apparatus.

It is a related object of this invention to provide improved methods and apparatus for selectively displaying interior decors.

It is a germane object of this invention to provide improved systems for assisting decorators, homemakers and others in selecting appropriate color, fabric and other combinations for interior decors or similar assemblies, and in composing interior decors.

It is a related object of this invention to provide improved systems for simulating, in an exchangeable manner, interior decors in particular, and assemblies of objects in general.

It is also an object of this invention to provide improved marketing systems for components of interior decor, such as carpeting, drapes, fabrics, painting and furniture, in particular, and for other merchandise in general.

Other objects of this invention will become apparent in the further course of this disclosure.

From a first aspect thereof, the subject invention resides in a method of displaying an interior decor. By way of example and not by way of limitation, such method and corresponding apparatus may be employed in assisting interior decorators and homemakers in selecting appropriate color and fabric combinations for their interior decors, or in composing suitable decors.

The invention according to the mentioned first aspect thereof resides, more specifically, in the improvement comprising, in combination, the steps of providing a luminance image of components of the interior decor, providing different fabric samples for such components, picking up the color of a first fabric sample, picking up the color of a second fabric sample, providing and displaying said image with the picked-up color of the first sample for one of said components and with the picked-up color of the second sample for another of said components, picking up the color of a third fabric sample, and substituting in the display of said one component the picked-up color of said third sample for said picked-up color of the first sample.

According to a preferred embodiment of this aspect of the subject invention, the color of the first fabric sample is picked up from an area of such first sample smaller than the displayed area of one of the components, and the color of the second fabric sample is likewise picked up from an area of the second sample smaller than the displayed area of the other of the mentioned components. The display of the mentioned one component is provided with the picked-up color of the first fabric sample over an area larger than the mentioned area of the first sample, and the display of the other component is provided with the picked-up color of the second fabric sample over an area larger than the mentioned area of the second sample.

According to a preferred embodiment of the subject invention, the color of a third fabric sample is picked up and is substituted in the display of the mentioned one component for the picked-up color of the first sample. Similarly, the color of a fourth fabric sample may be picked up and substituted in the display of the mentioned other component for the picked-up color of the second sample.

Where one of the fabric samples, such as the first sample, has a recurring pattern, a method according to an embodiment of the subject invention may include the steps of picking up a sample of such pattern and providing a display of that recurring pattern by repeating the picked-up sample in the display of the particular component of the interior decor.

Other aspects of the subject invention, and clarifications and elaborations on statements so far made, will become apparent from the description of preferred embodiments set fourth below in conjunction with the drawings. The subject summary of the invention is neither intended as a substitute for the claims of the subject application, nor as a limiting influence on the ultimately granted patent rights.

BRIEF DESCRIPTION OF THE DRAWINGS

The invention and its various objects and aspects will become more readily apparent from the following detailed description of preferred embodiments thereof, illustrated by way of example in the accompanying drawing which is a block diagram of an interior decor composition and display system according to a preferred embodiment of the subject invention.

DESCRIPTION OF PREFERRED EMBODIMENTS

The interior decor composition and display system 10 shown in the accompanying drawing provides a neutral or luminance image of an interior decor 12 including components as hereinafter more fully described, and employs different fabric samples 14, 15, 16 and 17 for in effect coloring the components of the neutral display on a display or projection screen 13. In principle, the neutral display or luminance image of the interior decor may actually be projected on the screen 13 and may then be filled in with desired colors from the fabric samples. On the other hand, the luminance image may be stored, to be displayed after provision with desired color information.

By way of example, the system 10 includes a color video camera or other color sensor 18 for individually picking up the color of a first fabric sample 14 and the color of a second fabric sample 15. The system 10 then provides the initially neutral image of one of the components with the picked-up color of the first sample 14. By way of example, a display of carpeting 19 on the screen 13 may thus be provided with the color of the first sample 14. Similarly, the system 10 provides the display of another of the components with the picked-up color of the second sample 15. Again by way of example, a display of a couch and chairs 20 may on the screen 13 be provided with the color of the second sample 15.

In accordance with a preferred embodiment of the subject invention, the color sensor 18 also picks up the color of a third fabric sample 16 and the system 10 substitutes in the display of the mentioned one component, such as the display of the carpeting 19, the picked-up and displayed color of the first sample 14. In this manner, the presently considered embodiment of the subject invention conveniently provides for a deliberate change of colors of a displayed interior decor or other scene 12.

For example, the color sensor 18 may also pick up the color of a fourth fabric sample 17, and the system 10 may then substitute in the display of the other component 20 the picked-up color of the fourth sample 17 for the previously picked up and displayed color of the second sample 15. Different color combinations of an interior decor or other scene may thus be displayed to interior decorators, homemakers, customers and other persons. The number of fabric or color samples may and typically will be much larger than as shown in the drawings and so far discussed. In fact, the subject invention and its embodiments provide for a convenient realization of dozens of color combinations. In this respect, components other than the mentioned carpeting, couch and chairs may be displayed in the interior decor or scene at 13, and may selectively be provided with different colors. For instance, drapes 21 may be displayed in the scene at 13 and may sequentially be provided with different picked-up or otherwise generated colors.

In this connection, it should be understood that the expression "color" is herein employed in a broad sense, to cover not only hue, tint and other manifestations of light waves of different lengths, but to encompass also pattern, texture and other visible surface features, as well as their equivalent.

Similarly, the expression "fabric sample" is not to be respectively construed, in that color and texture samples may be employed which are not strictly of a fabric. For instance, flat or textured paint samples may be employed for such interior decor components as walls, ceilings, doors and wooden floors. Also, not all components of an interior decor or scene need necessarily be colored with the aid of samples. Rather, the color of some components may be provided synthetically or from memory.

Typically, and according to a preferred embodiment of the subject invention, there exist substantial size discrepancies between the fabric samples on the one hand and the displayed scene or interior decor components 19, 20 and 21, on the other hand. For instance, the color sensor 18 may pick up the color of the first fabric sample 14 from an area of that first fabric sample smaller than the displayed area of the one component 19. Similarly, the color sensor 18 may pick up the color of a second fabric sample 15 from an area of such second sample smaller than the displayed area of the other component 20. The system 10 then provides the display of the one component 19 with the picked-up color of the first sample 14 over an area larger than the area of the first sample. Similary, the system 10 provides the display of the other component 20 with the picked-up color of the second sample 15 over an area larger than the area of the second sample 15.

The color sensor 18 also may pick up the color of a third fabric sample 16 from an area of that first sample smaller than the displayed area of the one component 19, and the system 10 substitutes in the display of that one component 19 the picked-up color of the third sample 16 for the picked-up color of the first sample 14 over an area larger than the area of the third sample 16.

Similarly, the color sensor 18 may pick up the color of a fourth fabric sample 17 from an area of that fourth sample smaller than the displayed area of the other component 20, and the system 10 may substitute in the display of that other component 20 the picked-up color of the fourth sample 17 for the picked-up color of the second sample 15 over an area larger than the area of the fourth sample 17.

In principle, and within the broad scope of the subject invention, the image or image information for providing a luminance image or for providing on the screen 13 a neutral display of components of the interior decor or scene may be provided by or with the aid of drafting, picture taking or in any other suitable manner. According to the illustrated embodiment of the subject invention, a video camera 23 is employed for shooting or taking a picture of the interior decor or scene 12 with components 19, 20, 21, etc. The video camera may be a black and white or other camera, since the initial objective is to provide a luminance image of the components of the interior decor or scene. The pictorial information supplied by the camera 28 may be applied via an analog-to-digital converter 24 to a main memory 25.

In principle, the memory 25 may be a core, disc, tape or other memory having a sufficient storage capacity. In this respect, image information on several further interior decors or scenes 26 may be taken with the camera 23 and stored in the memory 25. In this manner, the operator of the system 10 has a choice of displaying different color combinations on various scenes or decors.

The images thus stored in the memory 25 may be of the type known in color video technology as "luminance images." In the course of the operation of the system 10, color information matching various samples 14, 15, 16, etc. is selectively added to one or more luminance images removed from storage for display. To this end, and in accordance with a preferred embodiment of the subject invention, corresponding edges of the components 19, 20 and 21 are determined and also stored in the memory.

On the subject of edge detection, reference may be had to Rosenfeld and Kak, DIGITAL PICTURE PROCESSING (Academic Press, 1976) § 8.2 *Edge Detection*, pp. 275 to 296. By way of example, an edge detector 28 may be associated with the main memory 25. The edge detector 28 receives each stored luminance image and detects corresponding edges in its components 19, 20 and 21.

By way of example, the edge detector 28 may detect first and second edges of the component 19 and third and fourth edges of the component 20, whereby the system 10 may fill the display of that one component 19 between the first and second edges with picked-up color of, for instance, the first sample 14, and may further fill the display of the other component 20 between the third and fourth edges with picked-up color of, say, the second sample 15.

In the edge detection mode, human interaction can improve performance substantially. In particular, edge detection is an off-line function whereby edges in the scene may be detected more accurately and errors corrected by human observation and interaction, and most of the luminous image preparation may take place before the system 10 is put on line with customers or other viewers.

The system 10 alternatively may fill the display of the one component 19 between the detected first and second edges with picked-up color of the third sample 16 in substitution of the mentioned picked-up color of the first sample 14. Similarly, the system 10 may fill the display of the other component 20 between the detected third and fourth edges with the picked-up color of the fourth sample 17 in substitution of the picked-up color of the second sample 15.

In case one of the components, such as the component 20, represents a group, such as a couch or sofa and several matching upholstered chairs, the edge detector 28 would detect corresponding edge pairs for each subcomponent, and the system 10 would fill the display of each component with a given picked-up color between matching edge pairs. The edge detector 28 would for this purpose distinguish between the leading edge and the trailing edge of each component in the stored image, relative to the scanning direction.

Edge information thus detected is stored in the main memory 25 along with the corresponding luminance image information for subsequent retrieval.

An item selector 31 determines or indicates the correlation of any scanned sample to the pertinent component of the scene. To this end, the item selector 31 may have an individual switch 32, 33 and 34 for each component. For instance, the switch 32 may be correlated to the carpet 19, the switch 33 to the couch and chair 20, and the switch 34 to the drapes 21. Accordingly, if the operator of the system 10 presents a first sample 14 to the color sensor 18 as one of several carpet samples, he may actuate the switch 32 in order to indicate to the system that the sample 14 is, indeed, a carpet sample.

Any closed items selector switch 32, 33 or 34 actuates a sample rate component 35 for sampling signals representing the color of any scanned sample for subsequent periodical reproduction causing the particular color to appear to the correct extent in the image display at 13.

The color sensor 18 is connected via low-pass filter 36 to a sample hold component 37 which stores picked-up color information for a predetermined or settable time after scanning of a fabric sample. In a tricolor system, the picked-up color information is typically analyzed into red (R), green (G) and blue (B) chroma components which, after analog-to-digital conversion, are applied to a random access memory (RAM) 38.

The item selector 31 also actuates a main memory address component 39 which for each given luminance image and actuated switch 32, 33 or 34 addresses the edge information stored in the main memory 25 for the particular component.

The memory 25 applies the thus addressed edge information to a video out control component 41 which initiates a gating of video information to a frame store 42. In particular, the component 41 applies received edge information to a video line gate signal generator 43 which, like the memory 25 and the remainder of the system, is synchronized by a clock 44.

During item or component select, memory locations corresponding to regions bordered by prestored item boundaries or component edges are thus fed the derived chroma information.

A particular picked-up color having been stored in the RAM 38, there may be a number of start/stop pairs which indicate the start and the end of such color information, as controlled by the edge or boundary information stored in the memory 25 upon edge detection at 28. Each start/stop pair bounds the beginning and ending of a component or of a member of a set of components as seen, for instance, in a horizontal scan direction of the interior decor image or scene 12, 26, etc. The item selector 31 with individual switches 32 to 34 acts via sample rate component 36 and main memory address 39 to correlate sensed color with edge information so that a particular decor or scene component will be correctly displayed on the screen 13.

Since the component or item size is a predetermined quantity, the sampling rate may be chosen with the item selection switch 31, as seen at 36. The color sensor 18, if focused on a small sample, typically has a resolution far greater than that required by the output display at 13. By way of example, we may assume that the sensor 18 can generate a 500×500 picture element or pixel image. If we assume by way of example a sample size of 5 cm×5 cm, we obtain a sample rate of 100 samples/cm. At this rate, a 200 cm sofa would be composed of 20,000 samples on each horizontal line. In the context of an output display at 13 of, say, $(1000)^2$ pixels, a 20,000 pixel requirement for but one line would be far too high.

A more reasonable value would be some 2 to 10 pixels per centimeter of the live-size decor or scene 12, 26, etc., depending on the desired size of the display at 13. To match the output of the sensor 18, we thus need 2 to 10 samples per centimeter and the sample rate component 36 thus takes only one sample out of n pixels or samples of the output of sensor 18; with n being equal to the ratio or proportion of the sampling rate of the color sensor 18 to the sample rate of the display at 13. For instance, if the display sample rate is 2 pixels/cm as in one of the above examples, then the sample rate component 36 would take only every fiftieth pixel out of the color sensor output.

Another consideration in this respect arises from the possible presence of flower prints or other patterns on any fabric sample. In this respect, if the color sensor 18 would merely look at a sample or a small area thereof, and if the system 10 would merely expand such sample or area to cover the particular component 19, 20 or 21 in the image displayed at 13, there would exist a danger that a single flower or other detail in a pattern of the fabric sample would cover an entire component or otherwise be blown out of proportion in the resulting display at 13.

Accordingly, in the case of fabric or other samples having a recurring textural or other pattern, an embodiment of the subject invention picks up a sample of the pattern and provides a display of the recurring pattern by repeating the picked-up sample in the display of the particular component, such as at the screen 13.

According to a preferred embodiment, the color sensor 18 picks up a sample of a recurring pattern from an area of the first sample 14 smaller than the displayed area of the one component 19, and the system 10 provides at 13 a display of that recurring pattern by repeating the picked-up sample in the display of the one component 19 over an area larger than the mentioned area of the first sample 14. In terms of the drawing, the system 10 displays the picked-up sample of the recurring pattern repetitively between detected first and second edges in the display of the particular component at 13.

The embodiments of the invention described in the preceding two paragraphs with respect to patterns may also be applied to a display of solid or plain colors, whereby a component may be colored by picking up a sample of a solid or plain color and repeating such picked-up sample in the display until the display of the particular component is filled therewith between corresponding edges.

The system 10 includes a Modulo-N counter 46 which determines how often the information of a picked-up color sample stored in the RAM 38 is to be repeated in order to fill the space in the display at 13 between corresponding boundaries or edge pairs of a given component. In this manner, the color and texture of a component may be adequately displayed on the basis of a relatively small sample. As mentioned above, this applies in the context of the subject invention whether the fabric sample is plain or has a pattern.

The Modulo-N counter 46 operates on a first input of a memory address component 47 for the RAM 38. In this manner the Modulo-N counter 46 informs the RAM 38 of the identity and repetitiveness of a color sample desired to be displayed in a given component of the decor or scene 12 at 13.

Apart from the repetition of a picked-up color or pattern sample in a horizontal line scan, the system 10 according to an embodiment of the subject invention also determines the number of adjacent horizontal line scans during which the particular display has to be repeated in order to fill the area of a displayed component in a vertical direction. To this end, the system 10 includes a Modulo-N line counter 49 which, like the Modulo-N counter 36, receives the line gate signal from the component 43 as a start signal.

The Modulo-N line counter 49 acts on a second input of the memory address component 47 in order to tell the RAM 38 how many times during horizontal scans a given color sample has to be repeated. The RAM 38 thus serves as an intermediate buffer between the color sensor 18 and the video frame store 42, with the component or item outline information being located in the RAM at this point of the video information processing.

In particular, the system 10 operating with the Modulo-N counter 46 and Modulo-N line counter 49 operates on the RAM 38 to repeat Modulo-N both horizontal pixels and horizontal groups of pixels vertically until an entire image item or component is completely colored. By way of example, what has been designated herein as "start/stop pairs" may in practice be reset and stop pulses. For a vertical leading edge encountered in a horizontal line, the memory 25 may issue a start or reset pulse resetting the Modulo-N counter 46 and starting a color insertion cycle for the display of the component. For the corresponding vertical trailing edge of the component, the memory 25 issues a stop pulse to the Modulo-N counter 46. Similarly, the memory 25 may provide the Modulo-N counter 49 with a start or reset pulse for any first or leading horizontal edge of a component, thereby starting a color line insertion cycle in a horizontal direction. The memory 25 may further provide the Modulo-N counter 49 with a stop pulse for the corresponding second or trailing horizontal edge of the particular component, thereby stopping the particular color line insertion or repetition cycle.

The system 10 may provide chroma information by forming color difference signals (R-Y), (G-Y) and (B-Y) according to the established criterion of $$Y = 0.3R + 0.59G + 0.11B$$

so that, for instance, $(R-Y) = 0.7R - 0.6G - 0.1B$

The significance and generation of such color difference signals is well known as such in the color video art. By way of example, a chroma information component 51 receives the color component signals R, G and B from the RAM 38 and applies a corresponding luminance signal Y and color difference signal (G-Y) and (R-Y) to a hue control 52 which allows hue adjustment for each item or component selected, in order to compensate for possible color inaccuracies in the display at 13. In practice, the hue control at 52 may involve a control of the RGB ratios which are sent to the video frame store 42.

The hue control 52 applies the adjusted or modified luminance and chrominance signals Y, (G-Y)' and (R-Y)' to a luminance gain component or adder 53 which adds the chroma information to the pre-stored luminance information derived from the main memory 25 via a low-pass filter 54. Preferably, the hue of each picked-up color sample is adjusted individually.

In this respect, the luminance portion of the system 10 may be viewed as a shading chain which represents the natural illumination of the scene 12, providing a "neutral colored" scene with no high-frequency information. The luminance portion of the system is thus typically a low-frequency chain. On the other hand, the chroma portion of the system preferably is a high-frequency or detailing chain.

The luminance information in the memory 25 may thus represent a gray level scene with little texture information. The system 10 controls the level of the luminance portion, Y, of the color signal with the gray level scene information. In particular, this function of the system is performed by the low-pass filter 54 and luminance gain component 53. In the final display at 13, the color information represents, for instance, the fabric, while the luminance information represents the gray level scene.

More specifically, the luminance gain component 53, in response to the luminance information received from memory 25, modifies the luminance component, Y, of the color signal received from the hue control 52. As a result, the luminance gain component 53 supplies a modified signal Y', (G-Y)' and (R-Y)' to the video formation component 56. The latter component 56, in turn, converts the luminance-modified color signal into three color component signals G', B' and R' which, in turn, are applied to the input of a video gate 57. A control input of the video gate 57 receives the video line gate signal from the synchronized signal generator 53 which also drives the Modulo-N counter 46 and the line counter 49.

The video gate 57 thus applies the color component signals G', B' and R' to the frame store 42 for synchronous storage therein. In principle, the three color images represented by the components G', B' and R' may be stored separately but synchronously in the frame store 42. A number of full color video frame stores suitable at 42 are commercially available and typically have their own specific modes of storage.

Considering the function of the video out control 41 and video line gate control 43, it will be understood that the video gate 57 is in effect controlled by the edge information stored in the main memory 25 and that the frame store 42 accordingly contains video information including the gray level scene picked up at 12, 23 and 26, as selectively colored and textured in response to fabric samples 14, 15, 16 and 17.

The color video information thus stored is displayed at 13 with the aid of a color video projector 58, typically including individual output screens and projector lenses for the red, green and blue color component images. Depending on the nature and kind of the projector 58, the color components and luminance information contained in the frame store 42 may be converted to a composite video signal, such as the NTSC, PAL or SECAM signal used in video broadcasting in different parts of the world. For high fidelity, each of the G', B' and R' color signals may be provided at full 4.0 MHz bandwidth or at another suitable bandwidth in the megahertz range.

By the use of different color or fabric samples and appropriate actuation of the item selector 31, the color of each displayed component 19, 20, 21, etc., as well as the color combination of the displayed decor or scene 12, 26, etc., may practically be changed at will. To this end, outlines of the various decor or scene components are stored in the system 10 as described above, and are selectively supplied with picked-up color information in a broad sense.

The subject invention and its embodiments thus provide improved systems for assisting decorators, homemakers and others in selecting appropriate color, fabric and other combinations for interior decors or similar assemblies.

The subject invention and its embodiments also provide effective assistance in the composition of interior decors or other scenes and in an exchangeable simulation of interior decors in particular, and assembly of objects in general.

Moreover, the subject invention and its embodiments provide improved marketing systems for components of interior decor, such as carpeting, drapes, fabrics, painting and furniture in particular, and for other merchandise in general.

The subject extensive disclosure renders apparent or suggest to those skilled in the art various modifications and variations within the spirit and scope of the subject invention, and various fields of utility beyond those stated above.

We claim:

1. In a method of displaying an interior decor, the improvement comprising in combination the steps of:
   providing a luminance image of said interior decor including said components;
   providing different fabric samples for said components;
   picking up the color of a first fabric sample;
   picking up the color of a second fabric sample;
   providing and displaying said image with the picked-up color of said first sample for one of said components and with the picked-up color of said second sample for another of said components;
   picking up the color of a third fabric sample; and
   substituting in the display of said one component the picked-up color of said third sample for said picked-up color of the first sample.

2. A method as claimed in claim 1, including further the steps of:
   picking up the color of a third fabric sample;
   picking up the color of a fourth fabric sample;
   substituting in the display of said one component the picked-up color of said third sample for said picked-up color of the first sample; and substituting in the display of said other component the picked-up color of said fourth sample for said picked-up color of the second sample.

3. A method as claimed in claim 1 or 2, wherein:
said first fabric sample has a recurring pattern; and
said method includes picking up a sample of said pattern and providing a display of said recurring pattern by repeating said picked-up sample in the display of said one component.

4. In a method of displaying an interior decor, the improvement comprising in combination the steps of:
providing a luminance image of said interior decor including said components;
providing different fabric samples for said components;
picking up the color of a first fabric sample from an area of said first sample smaller than the displayed area of one of said components;
picking up the color of a second fabric sample from an area of said second sample smaller than the displayed area of another of said components;
providing and displaying said image with the picked-up color of said first sample for one of said components over an area larger than said area of the first sample and with the picked-up color of said second sample for another of said components over an area larger than said area of the second sample.

5. A method as claimed in claim 4, including further the steps of:
picking up the color of a third fabric sample from an area of said third sample smaller than the displayed area of said one component; and
substituting in the display of said one component the picked-up color of said third sample for said picked-up color of the first sample over an area larger than said area of the third sample.

6. A method as claimed in claim 4, including further the steps of:
picking up the color of a third fabric sample from an area of said third sample smaller than the displayed area of said one component;
picking up the color of a fourth fabric sample from an area of said fourth sample smaller than the displayed area of said other component;
substituting in the display of said one component the picked-up color of said third sample for said picked-up color of the first sample over an area larger than said area of the third sample; and
substituting in the display of said other component the picked-up color of said fourth sample for said picked-up color of the second sample over an area larger than said area of the fourth sample.

7. A method as claimed in claim 4, 5 or 6, wherein:
said first fabric sample has a recurring pattern; and
said method includes picking up a sample of said pattern from an area of said first sample smaller than said displayed area of said one component and providing a display of said recurring pattern by repeating said picked-up sample in the display of said one component over an area larger than said area of the first sample.

8. A method as claimed in claim 4, including further the steps of:
detecting first and second edges of said one component;
detecting third and fourth edges of said other component;
filling the display of said one component between said first and second edges with said picked-up color of said first sample; and
filling the display of said other component between said third and fourth edges with said picked-up color of said second sample.

9. A method as claimed in claim 8, including further the steps of:
picking up the color of a third fabric sample from an area of said third sample smaller than the displayed area of said one component; and
filling the display of said one component between said first and second edges with said picked-up color of said third sample in substitution of said picked-up color of said first sample.

10. A method as claimed in claim 8, including further the steps of:
picking up the color of a third fabric sample from an area of said third sample smaller than the displayed area of said one component;
picking up the color of a fourth fabric sample from an area of said fourth sample smaller than the displayed area of said other component;
filling the display of said one component between said first and second edges with said picked-up color of said third sample in substitution of said picked-up color of the first sample; and
filling the display of said other component between said third and fourth edges with said picked-up color of said fourth sample in substitution of said picked-up color of the second sample.

11. A method as claimed in claim 8, 9 or 10, wherein:
said first fabric sample has a recurring pattern; and
said method includes picking up a sample of said pattern from an area of said first sample smaller than said displayed area of said one component and providing a display of said recurring pattern by displaying said picked-up sample repetitively between said first and second edges in the display of said one component.

12. In apparatus for displaying an interior decor with the aid of fabric samples, the improvement comprising in combination:
first means for providing a luminance image of said interior decor including said components;
second means for picking up colors of said fabric samples, including means for picking up the color of a first fabric sample and the color of a second fabric sample; and
third means connected to said first and second means for providing and displaying said image with the picked-up color of said first sample for one of said components and with the picked-up color of said second sample for another of said components;
said third means including means for substituting in the display of said one component a picked-up color of a third fabric sample for said picked-up color of the first sample.

13. Apparatus as claimed in claim 12, wherein:
said third means include means for substituting in the display of said one component a picked-up color of a third fabric sample for said picked-up color of the first sample and for substituting in the display of said other component a picked-up color of a fourth fabric sample for said picked-up color of the second sample.

14. Apparatus as claimed in claim 12, wherein:

said second means include means for picking up a sample of a recurring pattern; and said third means include means for providing a display of said recurring pattern by repeating said picked-up sample in the display of said one component.

15. In apparatus for displaying an interior decor with the aid of fabric samples, the improvement comprising in combination:

first means for providing a luminance image of said interior decor including said components;

second means for picking up colors of said fabric samples, including means for picking up the color of a first fabric sample from an area of said first sample smaller than the displayed area of one of said components and the color of a second fabric sample from an area of said second sample smaller than the displayed area of another of said components; and third means connected to said first and second means for providing and displaying said image with the picked-up color of said first sample for one of said components over an area larger than said area of the first sample and with the picked-up color of said second sample for another of said components over an area larger than said area of the second sample.

16. Apparatus as claimed in claim 15, wherein:
said third means include means for substituting in the display of said one component a picked-up color of a third fabric sample for said picked-up color of the first sample.

17. Apparatus as claimed in claim 15, wherein:
said third means include means for substituting in the display of said one component a picked-up color of a third fabric sample for said picked-up color of the first sample and for substituting in the display of said other component a picked-up color of a fourth fabric sample for said picked-up color of the second sample.

18. Apparatus as claimed in claim 15, 16 or 17, wherein:

said second means include means for picking up a sample of a recurring pattern from an area of said first sample smaller than said displayed area of said one component; and said third means include means for providing a display of said recurring pattern by repeating said picked-up sample in the display of said one component over an area larger than said area of the first sample.

19. Apparatus as claimed in claim 15, including:
means for detecting first and second edges of said one component and third and fourth edges of said other component;

said third means including means for filling the display of said one component between said first and second edges with said picked-up color of said first sample and for filling the display of said other component between said third and fourth edges with said picked-up color of said second sample.

20. Apparatus as claimed in claim 19, wherein:
said substituting means include means for filling the display of said one component between said first and second edges with a picked-up color of a third sample in sustitution of said picked-up color of said first sample.

21. Apparatus as claimed in claim 19, wherein:
said substituting means include means for filling the display of said one component between said first and second edges with a picked-up color of a third sample in substitution of said picked-up color of the first sample and for filling the display of said other component between said third and fourth edges with a picked-up color of a fourth sample in substitution of said picked-up color of the second sample.

22. Apparatus as claimed in claim 19, 20 or 21, wherein:

said second means include means for picking up a sample of a recurring pattern; and said third means include means for providing a display of said recurring pattern by displaying said picked-up sample repetitively between said first and second edges in the display of said one component.

* * * * *